Sept. 3, 1957 M. G. HIGGINS 2,805,183
LAMINATED PRESSURE-SENSITIVE ADHESIVE TAPES
Filed July 19, 1955 2 Sheets-Sheet 1

*INVENTOR.*
MARTIN G. HIGGINS
BY
ATTORNEY

_United States Patent Office_

2,805,183
Patented Sept. 3, 1957

1

2,805,183

LAMINATED PRESSURE-SENSITIVE ADHESIVE TAPES

Martin G. Higgins, Lynn, Mass., assignor to Nevil-T Company, Lynn, Mass., a corporation of Massachusetts Application July 19, 1955, Serial No. 522,933

2 Claims. (Cl. 154—53.5)

The present invention relates to improvements in pressure-sensitive adhesive tapes.

The principal object of my invention is to improve the process and products of manufacture of laminated adhesive pressure-sensitive tapes, such as described and illustrated in patent to McManus and Higgins, No. 2,323,342, dated July 6, 1943.

Another object of my invention is to improve the process of spirally winding a roll of laminated pressure-sensitive tape in such a manner that after it is spirally wound it will not telescope; that is, that the side edges of the roll will remain in substantially even alignment notwithstanding its laminated structure, and even after long shelf-aging.

A still further object of my invention is to provide a strip of predetermined length of tape and non-adhesive liner therefor mounted on a wider backing or foundation liner of substantially non-adhesive material, such as a paper having a rubber base.

Another object of my invention is to provide strips of preferably is made of a selected paper comprises of a rubstrips may be mounted on wider strips of substantially non-adhesive foundation backing or liner, but the latter having just sufficient tackiness to enable the strips to be lightly held on the said foundation backing and ready for easy removal therefrom when it is desired to use the pressure-sensitive strip.

An additional object of my invention is to provide creased or partially cut strips adapted to be folded back upon themselves into a pile in accordion-fashion.

Figure 1:
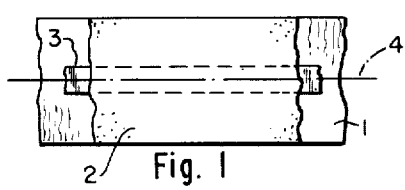
Figure 2:
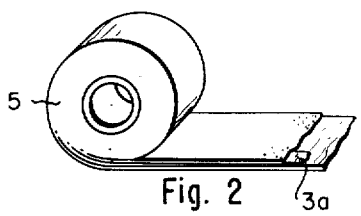
Figure 3:
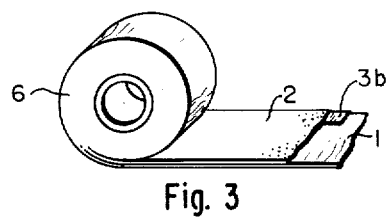
Figure 4:
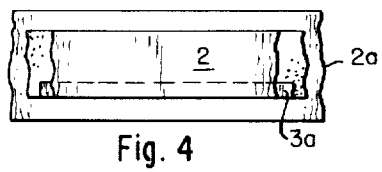
Figure 5:
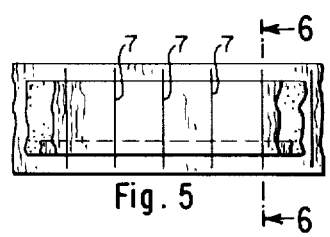
Figure 6:
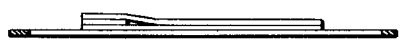
Figure 7:
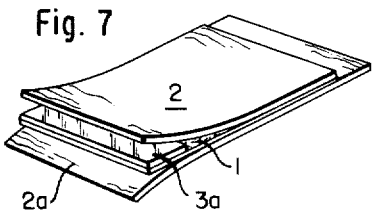
Figure 8:
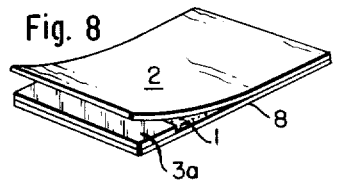
Figure 9:
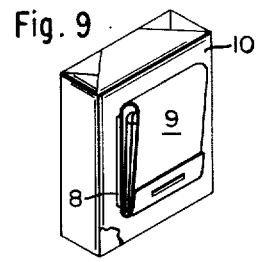
Figure 10:
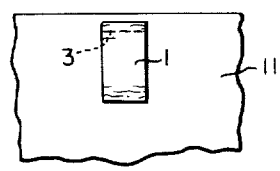
Figure 11:
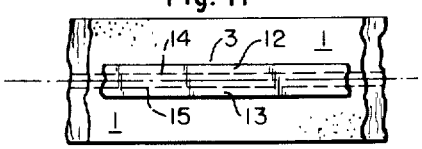
Figure 12:
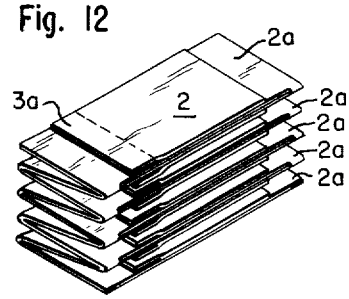
Figure 13:
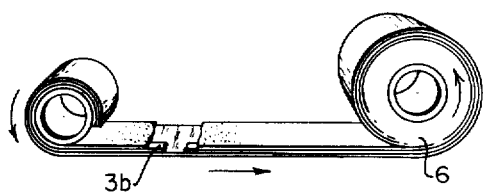

The above and further objects of my invention will be clearly understood by referring more specifically to the accompanying specification and drawings in which Figure 1 is a plan view of a portion of a strip of pressure-sensitive adhesive tape, showing the method of laminating the latter with a narrower strip adapted to be cut along its longitudinal center line; Figs. 2 and 3 illustrate two spirally wound rolls of the pressure-sensitive adhesive tape laminated with the secondary tape, and cut from a single roll along the longitudinal center line, Fig. 1. Fig. 4 shows a portion of a strip cut from a roll, the strip being mounted on a second or wider strip of substantially non-adhesive foundation backing or liner; Fig. 5 shows the construction illustrated in Fig. 4, but having transverse cuts or creases therein; Fig. 6 is an end view of the laminated structure shown in Figs. 4 and 5; Fig. 7 is a single unit detached from a strip illustrated in Fig. 5; Fig. 8 shows the unit illustrated in Fig. 7 with its underlying mount removed; Fig. 9 illustrates a paper matchbook and cigarette package to which a double-coated pressure-sensitive tape unit detached from a strip has been applied, as in Fig. 1 of the patent to McManus and Higgins hereinabove referred to; Fig. 10 shows such a detached single unit applied to a paper napkin; Fig. 11 is a view of a strip of adhesive tape having creases therein spaced at equal distances apart from the longitudinal center line of the tape; Fig. 12 shows the strip illustrated in Fig. 5 folded into an accordion-like package; Fig. 13

Figure 14:
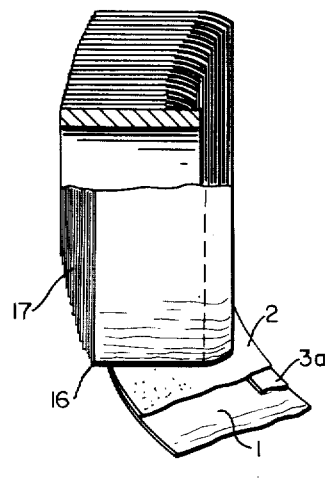
Figure 15:
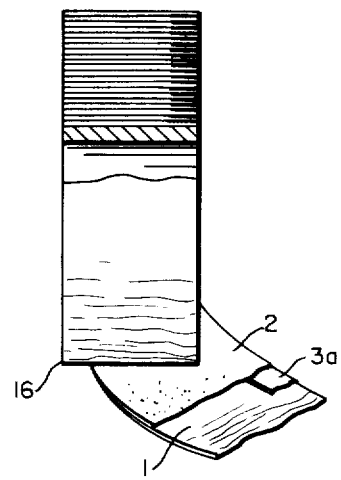

2 shows the position of the laminating narrow tape after the roll in Fig. 3 has been rewound; Fig. 14 shows the tendency of the rolls to telescope if the severing step of my invention is not employed, and Fig. 15 shows a roll wound in accordance with the process of my invention.

Referring now more specifically to the drawings, 1 represents the double-coated pressure-sensitive adhesive tape, and 2 the substantially non-adhesive liner or protector cover superposed thereon. This protecting liner preferably is made of a selected paper comprised of a rubber base, and is well known in the art. A strip of paper or cellophane 3 having at least its top surface non-adhesive is laid on and adhered to the top surface of the tape 1, with its longitudinal center line 4 coincident with the longitudinal center line of the tape; and extends throughout the entire length of the tape. The strip 3 is much narrower than the tape 1, and a good proportion of relative width with respect to tape 1 is illustrated in Fig. 1. If desired, a tape roll double the width of one of the rolls 5 and 6 of Figs. 2 and 3 may be unrolled and processed so that narrow strip 3 can be interleaved between the top of tape 1, and protecting cover or liner 2. This results in a laminated structure. The laminated roll thus formed may now be slit by a suitable slitting knife, thus producing two rolls 5 and 6, illustrated in Figs. 2 and 3, respectively, the slitting being done along the coincident center line 4, Fig. 1. The two tape rolls 5 and 6 will each have a laminating cellophane narrow strip 3a and 3b respectively, each one-half the width of the original strip 3, Fig. 1, but it will be noted that these two narrow strips 3a and 3b will be on opposite longitudinal edges of the tape rolls 5 and 6. As it is desirable in practical use to have narrow strip 3 in a predetermined position, such as shown at 3, Fig. 10, it is necessary to rewind one of the rolls 5 and 6 (either one) in order to bring narrow liner 3 of both rolls into the same relative position along the longitudinal length of the tape.

Inasmuch as one of the surfaces of double-coated tape 1 will have no protecting cover or liner when said tape is unwound from the roll. I have provided a means for protecting said surface by mounting a strip of the tape upon a second substantially non-adhesive liner or foundation backing 2a, Fig. 4. While said liner is theoretically non-adhesive I have found that it has sufficient tackiness, because of its rubber content, to hold the tape strip lightly thereto, at least without the tape dropping off the same. Thus, I find I can prepare strips of indefinite length from a roll and mount them on the backing, as shown in Fig. 4.

In Fig. 5 is illustrated a strip and backing as shown in Fig. 4, but having the additional desirable feature that cuts 7 may be made at predetermined widths along and through the laminated structure shown in Fig. 4. The cuts are not extended far enough laterally to separate the pieces between the cuts, but sufficiently so to easily detach them from the strip when ready for use. Or, if it is desired to deeply crease the strip instead of cutting them, this method of preparation of the strip of indefinite length may be employed. Fig. 7 shows one of the units between the cuts or creases detached from such a prepared strip, and Fig. 8 shows a similar unit with the bottom or foundation liner 2a removed.

As an illustration of the method of application of the prepared adhesive units, such, for example, as that shown in Fig. 9 bottom adhesive surface 8 of Fig. 8 is applied to the under surface of matchbook 9, Fig. 9, after which non-adhesive cover 2 is firmly pressed with the fingers to attach the sticker surface to said matchbook and then non-adhesive cover 2 is stripped or removed from the upper surface 1 of said sticker. The matchbook 9 is now firmly stuck or adhered to cigarette package 10 by means of the exposed adhesive surface 1, of the stickers.

Fig. 10 shows another application of the sticker unit shown in Fig. 8, wherein the same general method of sticking two surfaces together is employed to attach the sticker to a paper napkin 11, except that upper adhesive surface 1, is left exposed, ready for sticking to the clothing of the user when desired. This figure also shows the top non-adhesive surface of cellophane strip 3.

Of course, many other applications of these prepared double-coated adhesive stickers are possible. For example, portions 12 and 13 may be turned on creases 14 and 15 respectively, Fig. 11, to receive any suitable article in the folds therein, such as bristles of a paint brush adhered at their shanks to sticker surface 1, Fig. 11.

One means of packaging the sticker units, cut and assembled as shown in Fig. 5, is to fold them back on the cuts or creases 7 to make a pile, as shown in Fig. 12, from which pile each unit may be detached one at a time along the cuts or creases.

In Fig. 13 I have shown the roll 6, rewound or rerolled, in order to bring the narrow strip 3b into the same position along the bottom longitudinal edge of the tape as in roll 5, Fig. 2, where 3a illustrates the narrow intersleeved strip.

Referring again to Figs. 2 and 3, it will be noted that the rolls 5 and 6 were obtained by cutting through the protecting liner 2, narrow liner 3 and tape 1, along the coincident longitudinal line 4 of Fig. 1. As a result of this process the sides of the rolls 5 and 6 are maintained in a flat plane. If this method of procedure is not employed telescoping of the roll occurs, and the sides of the rolls, instead of being in a flat plane, project beyond the edge 16 of the roll, as illustrated at 17, Fig. 14. Fig. 15 shows a roll wound after employing the procedure referred to with reference to cutting as in Fig. 1, and in Fig. 15 all the convolutions of the roll are in alignment with edge 16. The elimination of the telescoping effect may be due to the relief of strain in the tape where the above-mentioned cutting step is employed. However, whatever the reason, telescoping, as in Fig. 14, is eliminated.

What I claim and desire to secure by Letters Patent of the United States is:

1. An extended strip of double coated primary pressure-sensitive adhesive tape having a substantially non-adhesive protecting cover overlying liner its top adhesive surface, its other adhesive surface attached to an underlying wider and similarly extended protecting cover, a narrower secondary tape lying along and attached to the primary tape along a lateral edge of the latter and interleaved between the top surface of said tape and the overlying protecting cover, and both tapes and the cover liner having cuts at predetermined widths along the strips extending to near the lateral edges of the latter adapted to easy detachment of single pieces of the strips along the line of the cut.

2. A composite strip of pressure-sensitive adhesive tape adapted to be folded into accordion-like units, one surface of said tape laminated with a narrow tape having a substantially nonadhesive upper surface, protecting liners for the top and bottom surfaces respectively of the adhesive tape units and one of said protecting liners extending beyond the longest sides of said units and cuts at predetermined widths extending transversely of the composite strip and adapting the units to be folded back on each other into an accordion-like pile.

References Cited in the file of this patent
UNITED STATES PATENTS

| | | |
|---|---|---|
| 2,323,342 | McManus et al. | July 6, 1943 |
| 2,568,463 | Reynolds | Sept. 18, 1951 |
| 2,633,440 | Scholl | Mar. 31, 1953 |
| 2,652,351 | Gerhardt | Sept. 15, 1953 |
| 2,667,436 | Goepfert et al. | Jan. 26, 1954 |
| 2,702,772 | Pronio | Feb. 22, 1955 |

UNITED STATES PATENT OFFICE

CERTIFICATE OF CORRECTION

Patent No. 2,805,183                          September 3, 1957

Martin G. Higgins

It is hereby certified that error appears in the printed specification of the above numbered patent requiring correction and that the said Letters Patent should read as corrected below.

Column 1, lines 35 and 36, for "preferably is made of a selected paper comprises of a rubstrips" read -- pressure-sensitive laminated tape cut from a roll, which strips --; column 4, line 7, after "cover" insert -- liner --.

Signed and sealed this 12th day of November 1957.

(SEAL)
Attest:
KARL H. AXLINE
Attesting Officer

ROBERT C. WATSON
Commissioner of Patents